United States Patent [19]

Berry et al.

[11] Patent Number: 5,692,205

[45] Date of Patent: Nov. 25, 1997

[54] METHOD AND SYSTEM FOR INTEGRATION OF MULTIMEDIA PRESENTATIONS WITHIN AN OBJECT ORIENTED USER INTERFACE

[75] Inventors: Richard E. Berry, Georgetown, Tex.; Thomas Neil Richards, Raleigh, N.C.

[73] Assignee: International Business Machines Corporation, Armonk, N.Y.

[21] Appl. No.: 749,836

[22] Filed: Nov. 15, 1996

Related U.S. Application Data

[63] Continuation of Ser. No. 168,721, Dec. 16, 1993, abandoned.

[51] Int. Cl.$^6$ .................... G06F 15/00; G06F 17/30
[52] U.S. Cl. .................... 395/788; 395/778; 395/614; 395/349; 395/339; 395/326
[58] Field of Search .................... 395/788, 778, 395/614, 349, 339, 326

[56] References Cited

U.S. PATENT DOCUMENTS

| | | | |
|---|---|---|---|
| 4,914,586 | 4/1990 | Swinehart et al. | 395/600 |
| 4,931,950 | 6/1990 | Isle et al. | 395/11 |
| 5,060,135 | 10/1991 | Levine et al. | 395/275 |
| 5,065,345 | 11/1991 | Knowles et al | 395/154 |
| 5,072,413 | 12/1991 | Seki et al. | 395/127 |
| 5,136,712 | 8/1992 | Perazzoli et al. | 395/700 |
| 5,140,677 | 8/1992 | Fleming et al. | 395/159 |
| 5,345,550 | 9/1994 | Bloomfield | 395/157 |
| 5,412,774 | 5/1995 | Agrawal et al. | 395/340 |

FOREIGN PATENT DOCUMENTS

2271005 A  3/1994  United Kingdom .

OTHER PUBLICATIONS

Berry, "The designer's model of the CUA Workplace", IBM Systems Journal, v. 31, n. 3, pp. 429–458, Aug. 1992.
England, "MUD: Multiple-view User Interface Design", Human-Computer Interaction—INTERACT'90, Diaper et al. (eds.), pp. 613–618, Aug. 1990.
Anonymous, "User specifiable logically organized views in a desktop environment", RD 31921, Research Disclosure, Nov. 1990.

Mamou et al., "Interactive Manipulation of Object-oriented Views", Proceedings of the 7th Int'l Conf. on Data Engineering, pp. 60–69, Apr. 1991.

Phillips, Richard L., "Media View: A General Multimedia Digital Publication System," 8070 Communications of the ACM, 34 (1991) Jul., No. 7, New York, US.

Klas, Wolfgang, et al., "Using an Object-Oriented Approach to Model Multimedia Data," 8260 Computer Communications, 13 (1990) May, No. 4, London, GB.

*Primary Examiner*—Heather R. Herndon
*Assistant Examiner*—Joseph R. Burwell
*Attorney, Agent, or Firm*—Jeffrey S. LaBaw; Brian F. Russell; Andrew J. Dillon

[57] ABSTRACT

A method and system are disclosed for integrating multimedia presentations into an object oriented user interface which includes multiple polymorphic objects which each have associated encapsulated data and functionality. Multiple separate user selectable data views are defined for each object which provide different views of the data associated with an object. Selection by a user of an audio or video data view for an object results in the provision of a multimedia presentation by automatically coupling audio or video data to an appropriate device. Audio data may be directly associated with an object or derived in response to selection of an audio data view, by means of a text-to-speech process, or other similar technique. Encapsulating multimedia data within an object integrates multimedia presentation capability within an object without requiring separate audio or video objects which must be manipulated by the user.

18 Claims, 5 Drawing Sheets

METHOD AND SYSTEM FOR INTEGRATION OF MULTIMEDIA PRESENTATIONS WITHIN AN OBJECT ORIENTED USER INTERFACE

This is a continuation of application Ser. No. 08/168,721 filed Dec. 16, 1993, now abandoned.

BACKGROUND OF THE INVENTION

1. Technical Field

The present invention relates in general to improved multimedia presentations within a data processing system and in particular to a method and system for integrating multimedia presentations within an object oriented user interface in a data processing system. Still more particularly, the present invention relates to a method and system for providing selectable multimedia presentations within an object oriented user interface by means of diverse user selectable data views for each object.

2. Description of the Related Art

The use of multimedia within computer user interfaces is growing very rapidly. Diverse media, such as text, graphics, image, audio and video may be combined to provide a highly interactive and communicative user interface, greatly contributing to an overall increase in productivity and user satisfaction.

Known approaches to providing multimedia support within data processing systems typically involve providing a "player" interface for each multimedia object. For example, audio and video are typically treated as individual objects and control panels representing cassette tape players, video cassette recorders, laser disc players and other such devices are graphically displayed in order to permit the user to access recorded information by graphically manipulating the audio or video object with the "player" device.

While this approach provides a logical and effective technique whereby multimedia may be utilized within a data processing system, the requirement to provide graphic representations of various "player" devices, in order to access each different type of multimedia output can be quite burdensome for the programmer. It can also be quite distracting for users who typically wish to focus on their data.

Recently, so-called "object oriented programming" interfaces have been proposed for utilization within complex computer systems. An interface which is object oriented is typically characterized by three important features which distinguish such systems from traditional programming languages. Firstly, the "objects" within an object oriented programming system are typically "polymorphic," that is, each object has the ability to respond to an identical message in a different way. Thus, when an object receives a command a translator is provided which determines what the response of that object should be to that type of command.

Next, the objects within an object oriented user interface demonstrate "inheritance" or the ability of an object to derive its data and functionality automatically from another object. Finally, an object is said to be "encapsulated" when its private data are protected from outside access. That is, no other object will be able to access the object's internal data.

Another common characteristic of object oriented user interfaces is the data view separation model. This model is based upon the premise that objects within an object oriented user interface are separable into data and views of that data and that a single object may provide multiple diverse views of the same data. For example, in modern spreadsheet programming systems a selected file of data may be "viewed" as a numerical spreadsheet, or a graphical chart.

While object oriented user interfaces are known to provide this diverse data view capability, the presentation of multimedia files within object oriented user interfaces is still generally accomplished utilizing the graphic manipulation of output files which are characterized by the type of media and which are output utilizing a specific "player" device. It should thus be apparent that a need exists for a method and system which provides for a more intuitive and efficient technique for integrating multimedia presentations into object oriented user interfaces.

SUMMARY OF THE INVENTION

It is therefore one object of the present invention to provide an improved multimedia presentation within a data processing system.

It is another object of the present invention to provide an improved method and system for integrating multimedia presentations within a object oriented user interface within a data processing system.

It is yet another object of the present invention to provide an improved method and system for providing selectable multimedia presentations within an object oriented user interface by means of diverse user selectable data views of each object.

The foregoing objects are achieved as is now described. The method and system of the present invention may be utilized to integrate multimedia presentations into an object oriented user interface which includes multiple polymorphic objects which each have associated encapsulated data and functionality. Multiple separate user selectable data views are defined for each object which provide different views of the data associated with an object. Selection by a user of an audio or video data view for an object results in the provision of a multimedia presentation by automatically coupling audio or video data to an appropriate device. Audio data may be directly associated with an object or derived in response to selection of an audio data view, by means of a text-to-speech process, or other similar technique. Encapsulating multimedia data within an object integrates multimedia presentation capability within an object without requiring separate audio or video objects which must be manipulated by the user.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
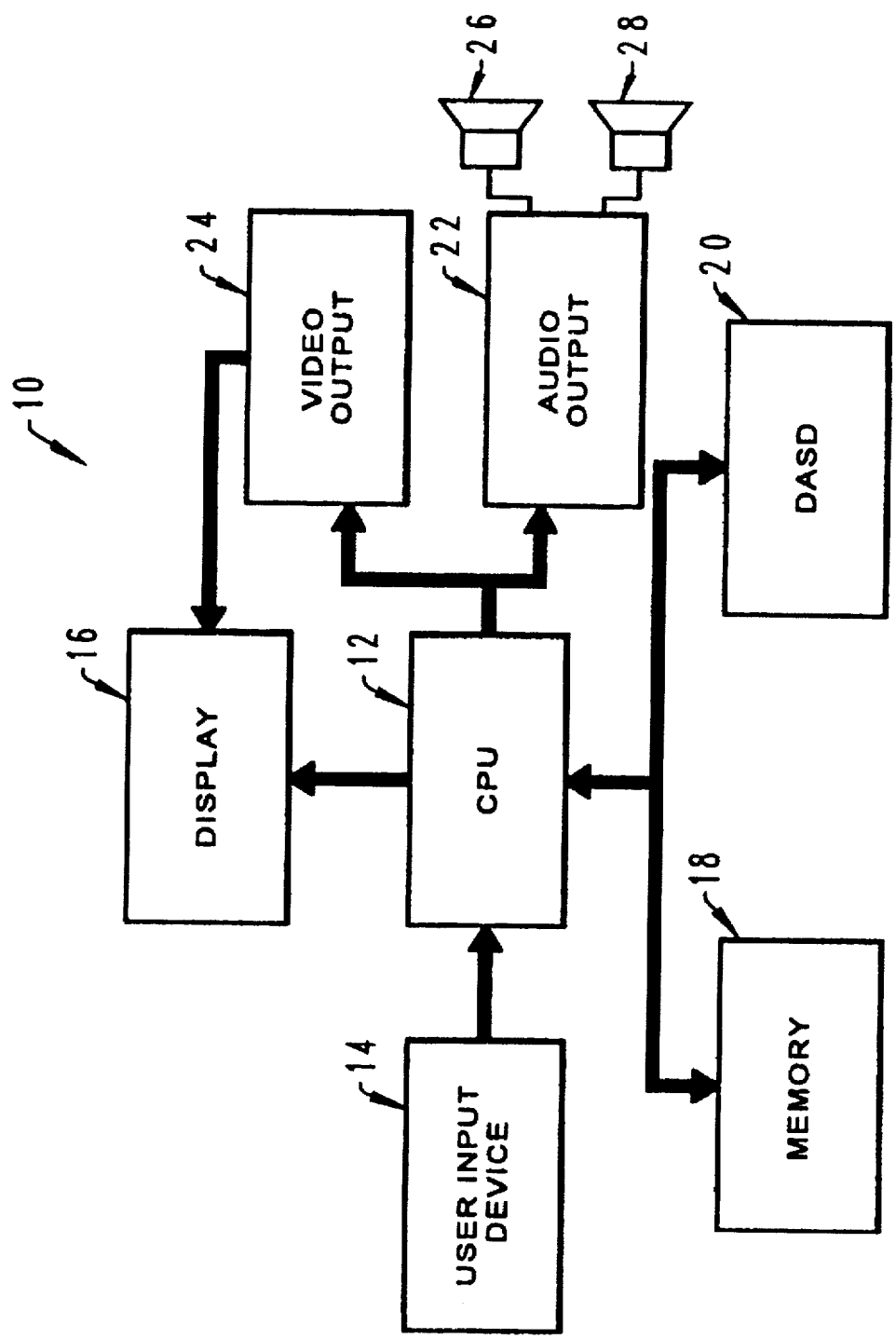
FIG. 1 is a high level block diagram of a data processing system which may be utilized to implement the method and system of the present invention.

With reference now to the figures and in particular with reference to FIG. 1, there is depicted a pictorial representation of a data processing system 10 which may be utilized to implement the method and system of the present invention. Data processing system 10 of the preferred embodiment of the present invention may be implemented utilizing any so-called "personal computer" such as the International Business Machines Corporation PS/2 personal computer, although any data processing system which supports object oriented user interfaces may be utilized. As illustrated, data processing system 10 preferably includes a central processing unit 12 and a user input device 14. User input device 14 preferably comprises a keyboard and a graphic user input device, such as a mouse, light pen or similar device. User input device 14 is preferably coupled to central processing unit 12 utilizing a cable in a manner well known in the art.

Also coupled to central processing unit 12 is display 16. Display 16 is preferably provided utilizing a color monitor which is capable of displaying computer graphics, text and video, in accordance with a preferred embodiment of the present invention. Central processing unit 12 is also coupled to memory 18 and one or more direct access storage devices (DASD) as depicted at reference numeral 20. Memory 18 and direct access storage device 20 may be utilized for storing application programs in a manner well known in the art.

An audio output device 22 is also coupled to central processing unit 12. Audio output device 22 preferably includes an amplifier and may provide stereophonic audio output by means of speakers 26 and 28. Audio output device 22 may be implemented utilizing well known commercially available devices such as the SoundBlaster audio card manufactured by Creative Labs. Video output device 24 is also coupled to central processing unit 12 and, in response to the coupling of video data from central processing unit 12 to video output device 24, may create a video output presentation which is coupled to display 16 in the depicted embodiment of the present invention.

Those skilled in the art will appreciate that video output device 24 may comprise video adapter card within central processing unit 12, such as the VideoBlaster card manufactured by Creative Labs. Such cards utilize video data from memory to produce a video output, but may also accept external sources of video data such as a video cassette recorder, a laser disc player, or any other suitable video output device.

Figure 2:
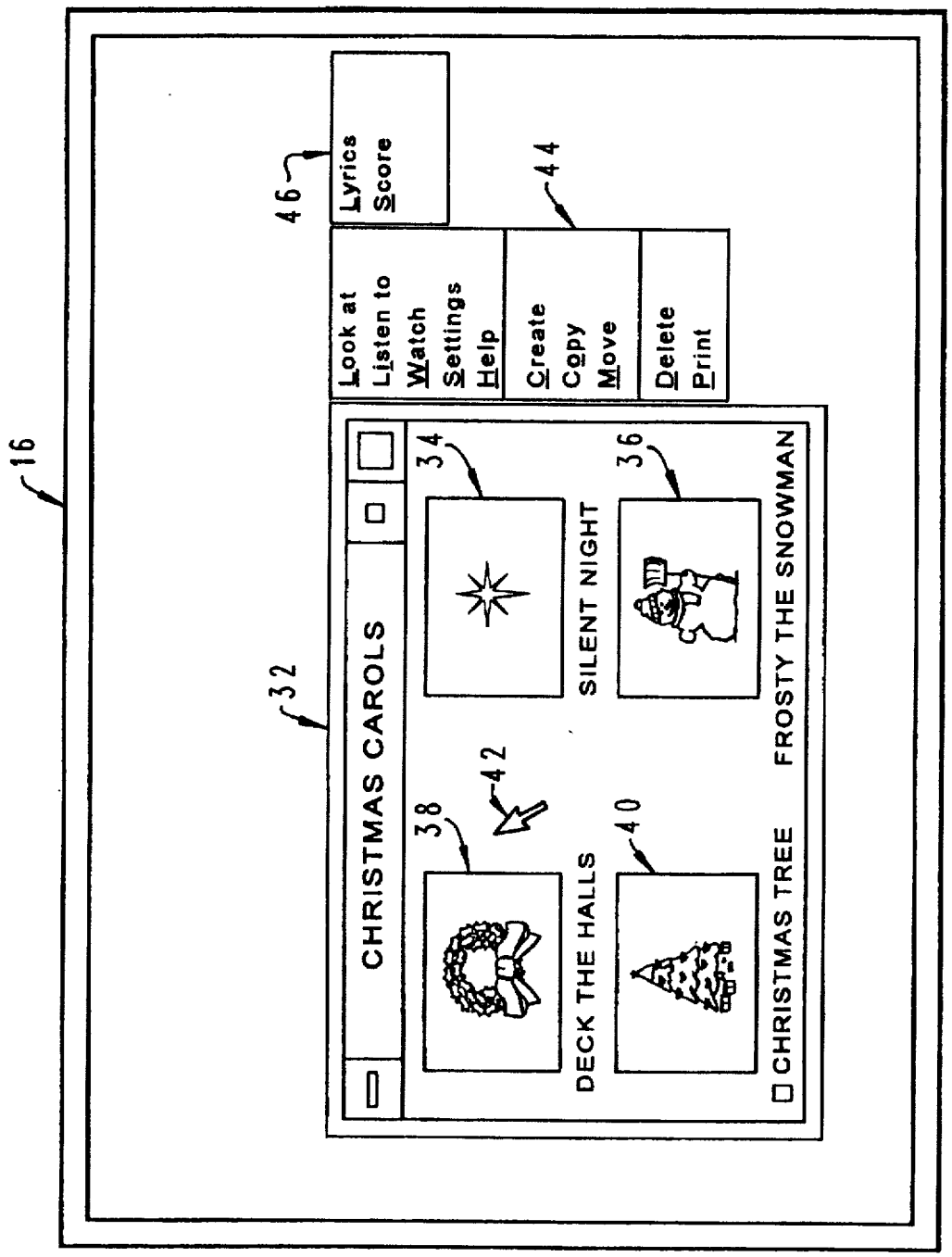
FIG. 2 is a pictorial representation of a data processing system display of multiple polymorphic objects provided within an object oriented user interface in accordance with the method and system of the present invention.

Referring now to FIG. 2, there is depicted a pictorial representation of a data processing system display of multiple polymorphic objects provided within an object oriented user interface in accordance with the method and system of the present invention. As illustrated, display 16 is utilized to present a viewport or window 32 which includes multiple polymorphic objects 34, 36, 38 and 40. As those skilled in the art will appreciate, object oriented user interfaces are said to be polymorphic when different types of objects within the interface respond to the same message in different ways. Thus, an object may be selected utilizing user input device 14, such as a mouse pointer, and manipulated in accordance with the methods which are consistent with the object oriented user interface.

Window 32, in the depicted embodiment of the present invention, illustrates a plurality of objects representative of Christmas carols. Thus, by utilizing mouse pointer 42, the user may select a particular object, such as object 38. Upon the selection of object 38, a so-called "pop-up" menu, such as pop-up menu 44 will be illustrated. As depicted within pop-up menu 44, a plurality of choices are presented to the user for selection. Thus, in accordance with the depicted embodiment of the present invention, the user may select various commands including "Look at," "Listen to," "Watch," "Settings," and "Help."

As illustrated within FIG. 2, the user may then select a choice within pop-up menu 44 and thereby manipulate an object within window 32. As is often permitted within such interfaces, the selection of a particular choice, for example, "Look at" may result in the display of a sub-menu. Thus, if the user selects the command "Look at," sub-menu 46 is presented. Sub-menu 46 includes the choices "Lyrics" and "Score." In this manner, the user may select the choice "Look at" and thereafter choose a presentation of the lyrics or the score of a selected Christmas carol.

Figure 3A:
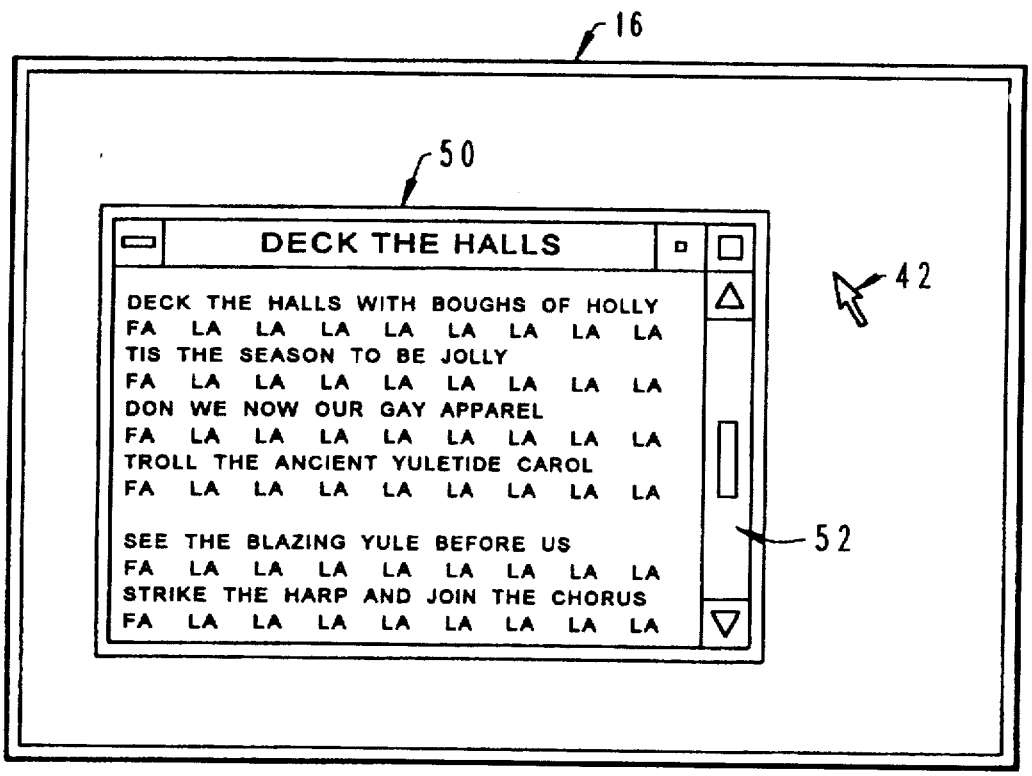
FIGS. 3a–3c are pictorial representations of multiple data views of a polymorphic object provided in accordance with the method and system of the present invention.
Figure 3B:
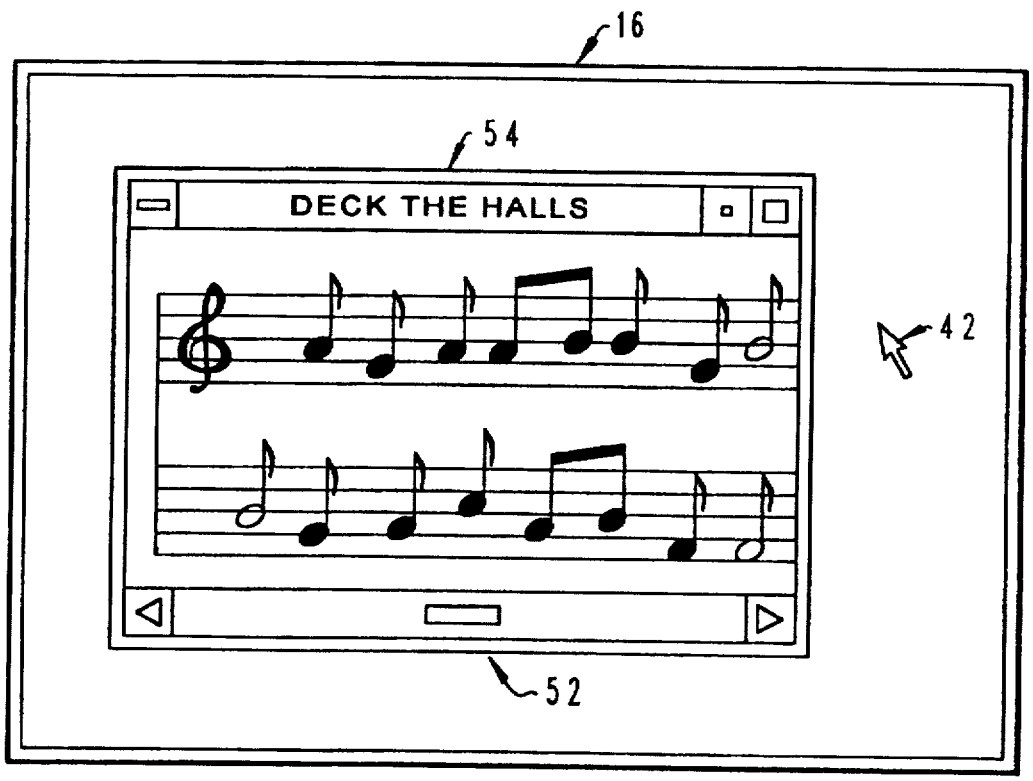
Figure 3C:
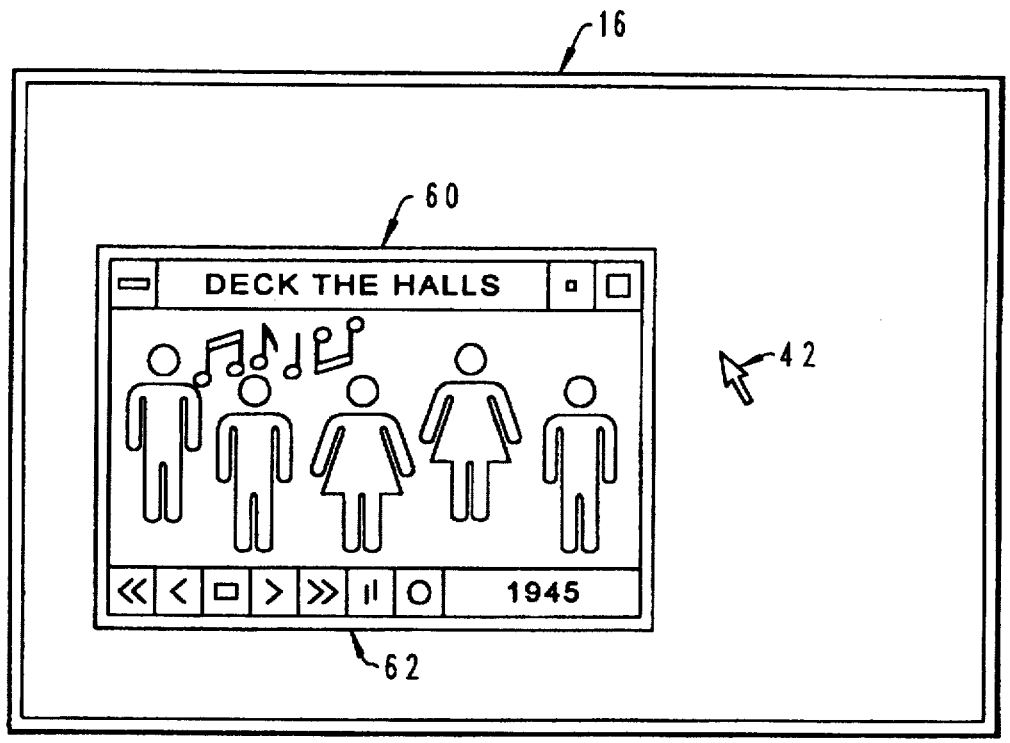

With reference now to FIGS. 3A through 3C, there are displayed pictorial representations of multiple data views of a polymorphic object which may be provided in accordance with the method and system of the present invention. As illustrated, after selecting polymorphic object 38, and the "Look at" command, and the "Lyrics" subcommand, a second window will open, overlying window 32. For clarity of explanation only the uppermost window is depicted within FIGS. 3A–3C. As illustrated, display 16 now includes a window 50 which displays the lyrics of the Christmas carol associated with the selected object. As is common in the graphic user interface art, a scroll bar 52 may be also be provided and manipulated, utilizing mouse pointer 42, to permit the user to scroll through the lyrics to the selected Christmas carol.

Alternately, if the user selects the command "Look at" and the subcommand "Score" the presentation provided will be that depicted within FIG. 3B. As illustrated, display 16 now depicts a window 54 which includes the musical score for the selected Christmas Carol associated with polymorphic object 38. As above, a scroll bar 52 is provided, in the horizonal plane, and may be manipulated utilizing mouse pointer 42 to access alternate portions of the musical score.

Referring now to FIG. 3C, the computer display presented therein comprises the response of the data processing system to a selection of the choice "Watch" by the user. As illustrated, a window 60 is provided which includes a video and audio presentation of a performance of the Christmas carol associated with polymorphic object 38. A command bar 62 is provided which implements the various interface commands typically associated with a video player device, such as "rewind," "reverse," "play," "stop," and "fast forward."

As should be apparent to those having skill in the art upon reference to FIGS. 3A–3C, a single polymorphic object 38 within window 32 of FIG. 2 may be selected by the user and three different data views may be provided. The lyrics, score or in actual video presentation of a performance of the Christmas carol associated with polymorphic object 38 may be provided for a single object, greatly enhancing the efficiency of data processing system 10 in integrating a multimedia presentation within the user interface.

Of course, a selection of the command "Listen to" will result in a presentation of an audio output only utilizing audio output device 22, and speakers 26 and 28 (see FIG. 1). This may be easily accomplished by encapsulating MIDI data within polymorphic object 38, or by encapsulating so-called "Wave" data for utilization with a waveform generation.

Figure 4:
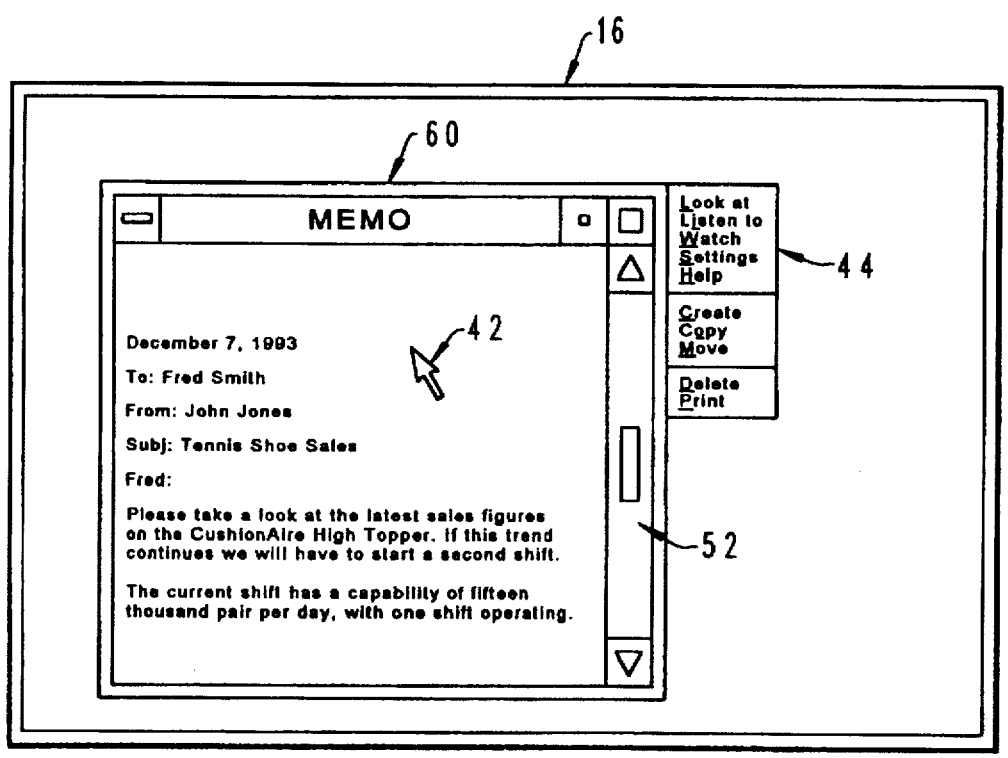
FIG. 4 is a pictorial representation of a second polymorphic object provided within an object oriented user interface in accordance with the method and system of the present invention.

The polymorphic nature of the objects within the object oriented user interface of the present invention is now illustrated with respect to FIG. 4, which depicts a pictorial representation of a second polymorphic object which is provided in accordance with the method and system of the present invention. As illustrated within display 16, a window 60 is provided which includes a textual memo. Upon selection of the memo utilizing mouse pointer 42, a pop-up menu 44 is illustrated which includes identical commands to those commands provided with respect to object 38 within FIG. 2. However, upon selection of the "Listen to" command, a verbal presentation of the memo may be provided. Of course, those skilled in the art will appreciate that such a verbal presentation may be generated utilizing a stored audio representation of the memo or by utilizing a text-to-speech process, which may be implemented within data processing system 10.

Thus, the command "Listen to" may be applied to any object within the object oriented user interface which contains multiple polymorphic objects and will be responded to in a different manner in response to the type of object to which that command is applied. Of course, the command "Watch" may not be applied to the memo depicted within window 60; and that choice will be displayed in a gray color, indicating its nonavailability. However, the remaining choices within pop-up menu 44 will be interpreted by the object represented within window 60 and applied, as appropriate. Alternately, a video presentation of the author of the memo within window 60 may also be displayed in response to a selection of the "Watch" command.

Figure 5:
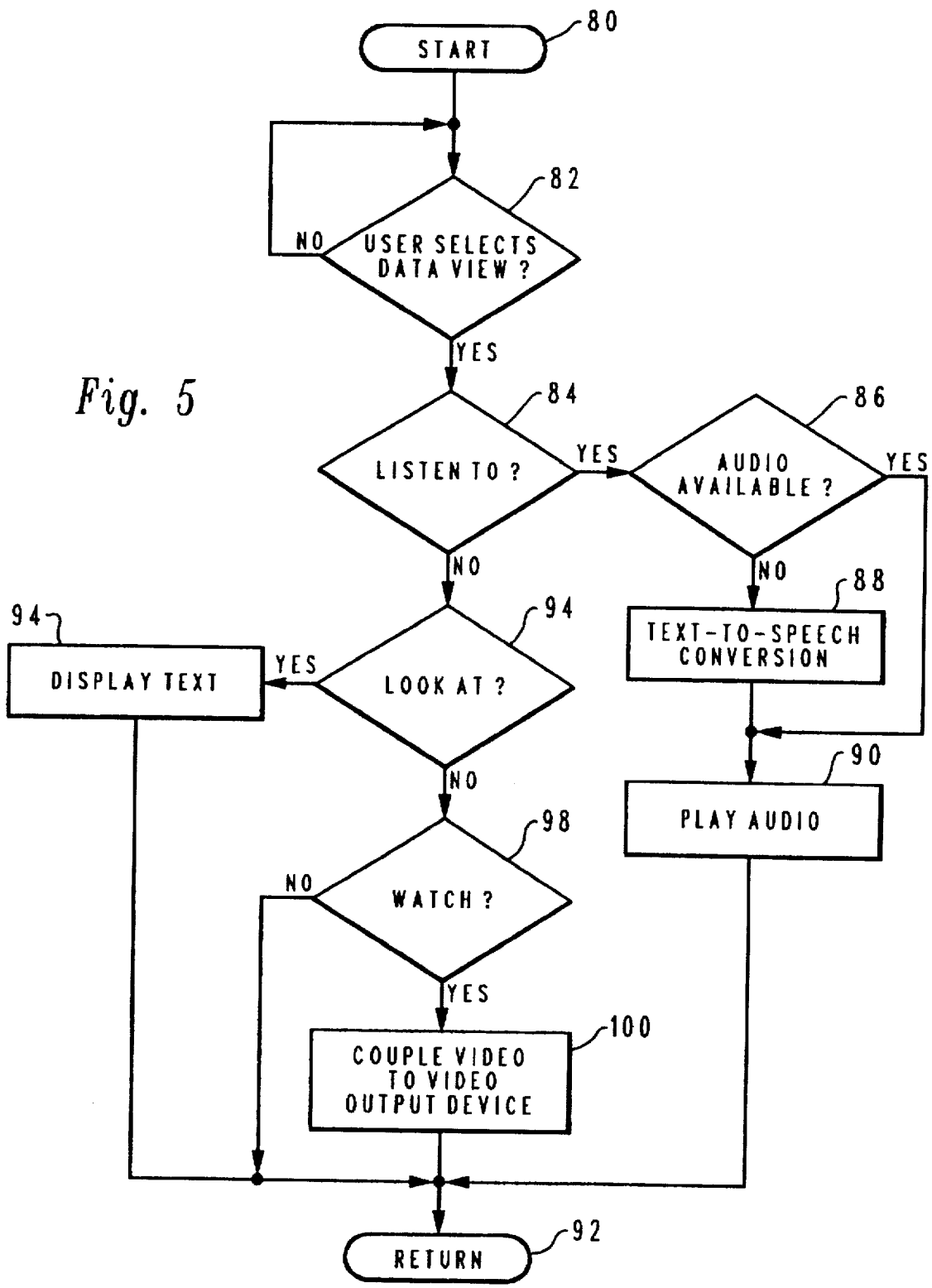
FIG. 5 is a high level logic flowchart which illustrates the provision of multiple data views of a polymorphic object in accordance with the method and system of the present invention.

Finally, with reference to FIG. 5, there is depicted a high level logic flowchart which illustrates the provision of multiple data views of a polymorphic object in accordance with the method and system of the present invention. As depicted, the process begins at block 80 and thereafter passes to block 82. Block 82 illustrates a determination of whether or the user has selected a data view of a polymorphic object. If not, the process merely iterates until such time as a data view has been selected by the user.

Once the user has selected a data view, as determined at block 82, the process passes to block 84. Block 84 illustrates a determination of whether or not the data view selected by the user is "Listen to." If so, the process passes to block 86. Block 86 illustrates a determination of whether or not audio data is available for the polymorphic object in question and if so, the process passes to block 90 which illustrates the playing of the audio. The process then passes to block 92 and returns.

Referring once again to block 86, in the event audio data is not available for the polymorphic object for which the user has selected this data view, the process passes to block 88. Block 88 illustrates the application of a text-to-speech conversion process, or other similar technique, and the process then passes to block 90 which illustrates the playing of the audio data view for that object. Once again, the process then passes to block 92 and returns.

Referring again to block 84, in the event the data view selected is not "Listen to" the process passes to block 94.

Block 94 illustrates a determination of whether or not the data view selected is "Look at" and if so, the process passes to block 96. Block 96 illustrates the display of the textual content of the object and the process then passes to block 92 and returns. Of course, in the illustration contained within FIGS. 2 and 3A–C, a choice of the "Look at" data view may result in a further determination of whether or not the user has selected the subcommand "Lyrics" or "Score" and will result in a display of the appropriate data view.

Referring again to block 94, in the event the user has not selected the "Look at" data view, the process passes to block 98. Block 98 illustrates a determination of whether or not the data view selected is the "Watch" data view and if so, the process passes to block 100. Block 100 illustrates the coupling of video to the video output device and the process then passes to block 92 and returns. In the event the data view selected is not the "Watch" command, the process passes from block 98 to block 92 and returns.

Of course, those skilled in the art will appreciate that these selected data views are merely illustrative of the different types of data views which may be associated with a particular object.

Upon reference to the foregoing those skilled in the art will appreciate that the Applicant has created a system wherein multimedia presentations may be integrated into a object oriented user interface within a data processing system by providing selected multimedia presentations as diverse data views of a single polymorphic object within the data processing system without requiring the express provision of a separate object for an audio or video presentation and the manipulation of an explicit player device. By integrating multimedia presentation into an object oriented user interface as a distinct data view of an object, the method and system of the present invention provides a novel and efficient technique for selecting and manipulating multimedia presentations within such a system.

While the invention has been particularly shown and described with reference to a preferred embodiment, it will be understood by those skilled in the art that various changes in form and detail may be made therein without departing from the spirit and scope of the invention.

We claim:

1. A method within a data processing system for integrating multimedia within an object oriented user interface, said method comprising the steps of:

providing a plurality of polymorphic program objects within said data processing system, each of said plurality of polymorphic program objects including specified encapsulated data and functionality;

for each of said plurality of polymorphic program objects, defining an associated plurality of user selectable data views of said specified encapsulated data, at least one of said associated plurality of user selectable data views comprising a multimedia data view; and in response to a user selection of a multimedia data view associated with a particular polymorphic program object among said plurality of polymorphic program objects, automatically presenting a multimedia data view within said data processing system of said specified encapsulated data of said particular polymorphic program object.

2. The method for integrating multimedia within an object oriented user interface according to claim 1, wherein at least one of said plurality of polymorphic program objects includes specified video data and wherein said step of automatically presenting a multimedia data view within said data processing system of said specified encapsulated data of said particular polymorphic program object comprises the step of automatically providing a video presentation of said specified video data.

3. The method for integrating multimedia within an object oriented user interface according to claim 1, wherein at least one of said plurality of polymorphic program objects includes specified graphics data and wherein said step of automatically presenting a multimedia data view within said data processing system of said specified encapsulated data of said particular polymorphic program object comprises the step of automatically providing a graphical presentation of said specified graphics data.

4. The method for integrating multimedia within an object oriented user interface according to claim 1, wherein at least one of said plurality of polymorphic program objects includes specified MIDI data and wherein said step of automatically presenting a multimedia data view within said data processing system of said specified encapsulated data of said particular polymorphic program object comprises the step of automatically providing an audio presentation of said specified MIDI data.

5. The method for integrating multimedia within an object oriented user interface according to claim 1, wherein said step of defining a plurality of user selectable data views associated with each of said plurality of polymorphic program objects comprises the step of defining an audio presentation view.

6. The method for integrating multimedia within an object oriented user interface according to claim 5, wherein at least one of said plurality of polymorphic program objects includes specified textual data and said data processing system includes a text-to-speech conversion process and wherein said step of automatically presenting a multimedia data view within said data processing system of said specified encapsulated data of said particular polymorphic program object comprises the step of automatically coupling said specified textual data to said text-to-speech conversion process in response to a user selection of an associated audio presentation view.

7. The method of integrating multimedia within an object oriented user interface according to claim 1, and further comprising the step of displaying a plurality of user selectable graphical objects within said object oriented user interface of said data processing system, wherein each of said plurality of user selectable graphical objects corresponds to a respective one of said plurality of polymorphic program objects within said data processing system.

8. The method of integrating multimedia within an object oriented user interface according to claim 7, wherein said step of automatically presenting a multimedia data view is performed in response to a user selection of both a user selectable graphical object corresponding to said particular polymorphic program object and said multimedia data view.

9. The method of integrating multimedia within an object oriented user interface according to claim 8, and further comprising:

in response to a user selection of one of said plurality of user selectable graphical objects, displaying an identifier of each of a plurality of user selectable data views associated with a corresponding polymorphic program object.

10. A data processing system having integrated multimedia within an object oriented user interface, said data processing system comprising:

a plurality of polymorphic program objects each of said plurality of polymorphic program objects including specified encapsulated data and functionality wherein each of said plurality of polymorphic program objects has an associated plurality of user selectable data views of said specified encapsulated data at least one of said associated plurality of user selectable data views comprising a multimedia data view; and means, responsive to a user selection of a multimedia data view associated with a particular polymorphic program object among said plurality of polymorphic program objects, for automatically presenting a multimedia data view within said data processing system of said specified encapsulated data of said particular polymorphic program object.

11. The data processing system according to claim 10, wherein at least one of said plurality of polymorphic program objects includes specified video data and wherein said means for automatically presenting a multimedia data view within said data processing system of said specified encapsulated data of said particular polymorphic program object comprises means for automatically providing a video presentation of said specified video data.

12. The data processing system according to claim 10, wherein at least one of said plurality of polymorphic program objects includes specified graphics data and wherein said means for automatically presenting a multimedia data view within said data processing system of said specified encapsulated data of said particular polymorphic program object comprises means for automatically providing a graphical presentation of said specified graphics data.

13. The data processing system according to claim 10, wherein at least one of said plurality of polymorphic program objects includes specified MIDI data and wherein said means for automatically presenting a multimedia data view within said data processing system of said specified encapsulated data of said particular polymorphic program object comprises means for automatically providing an audio presentation of said specified MIDI data.

14. The data processing system according to claim 10, wherein means for defining a plurality of user selectable data views associated with each of said plurality of polymorphic objects comprises means for defining an audio presentation view.

15. The data processing system according to claim 14, wherein at least one of said plurality of polymorphic program objects includes specified textual data and said data processing system includes a text-to-speech conversion process and wherein said means for automatically presenting a multimedia data view within said data processing system of said specified encapsulated data of said particular polymorphic program object comprises means for automatically coupling said specified textual data to said text-to-speech conversion process in response to a user selection of said audio presentation view.

16. The data processing system according to claim 10, and further comprising:

a display device; and means for displaying a plurality of user selectable graphical objects within said display device, wherein each of said plurality of user selectable graphical objects corresponds to a respective one of said plurality of polymorphic program objects.

17. The data processing system of claim 16, wherein said means for automatically presenting a multimedia data view within said data processing system presents said multimedia data view in response to a user selection of both a user selectable graphical object corresponding to said particular polymorphic program object and said multimedia data view.

18. The data processing system of claim 17, said means for automatically presenting a multimedia data view comprising:

means, responsive to a user selection of one of said plurality of user selectable graphical objects, for displaying an identifier of each of a plurality of user selectable data views associated with a corresponding polymorphic program object.

* * * * *